(12) United States Patent
Liu et al.

(10) Patent No.: US 6,556,979 B1
(45) Date of Patent: Apr. 29, 2003

(54) METHOD AND SYSTEM FOR IDENTIFYING CONSUMER CREDIT REVOLVERS WITH NEURAL NETWORK TIME SERIES SEGMENTATION

(75) Inventors: Shiping Liu, Castro Valley, CA (US); Edgar Leroy Murphy, Southlake, TX (US); David Wayne Nanek, Stormville, NY (US); Michael Rothman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 09/596,898

(22) Filed: Jun. 19, 2000

(51) Int. Cl.$^7$ ............................. G06E 1/00; G06E 3/00; G06F 15/18; G06G 7/00
(52) U.S. Cl. ........................................ 706/20; 705/38
(58) Field of Search ............................ 706/20, 26, 15; 705/36, 38

(56) References Cited

U.S. PATENT DOCUMENTS

| | | | |
|---|---|---|---|
| 5,262,941 A | 11/1993 | Saladin et al. | 705/38 |
| 5,521,813 A | 5/1996 | Fox et al. | 705/8 |
| 5,696,907 A | 12/1997 | Tom | 705/38 |
| 5,761,442 A | 6/1998 | Barr et al. | 705/36 |
| 5,870,721 A | 2/1999 | Norris | 705/38 |
| 5,933,817 A | 8/1999 | Hucal | 705/39 |
| 6,018,723 A | * 1/2000 | Siegel et al. | 705/38 |

OTHER PUBLICATIONS

Conference Title: "Proceedings of the International Conference on Artificial Neural Nets and Genetic Algorithms", Date: Apr. 14–16, 1993, Innsbruck, Austria.
Purcell, L. Roping in risk (neural networks in banks), Journal: Bank Systems+Technology vol. 31, No. 5, p. 64–66, Pub Date: May 1994, USA ISSN, 1045–9472.

* cited by examiner

*Primary Examiner*—John A. Follansbee
*Assistant Examiner*—Joseph H. Hirl
(74) *Attorney, Agent, or Firm*—Gregory M. Doudnikoff; Carstens, Yee & Cahoon, LLP

(57) ABSTRACT

Initially, customer time series credit files are acquired. The credit files are organized in a data mart environment for supporting a query system. Time series utilization attributes are created and a neural network time series segmentation process is applied and N×N dimension segments are generated for analysis. The chart may be modified to more accurately depict profitable credit revolvers. Credit data from each potential new customer is processed in a similar fashion by the neural network segmentation process. Profitable credit revolvers are identified by having credit utilization patterns belonging to profitable segments previously identified.

27 Claims, 10 Drawing Sheets

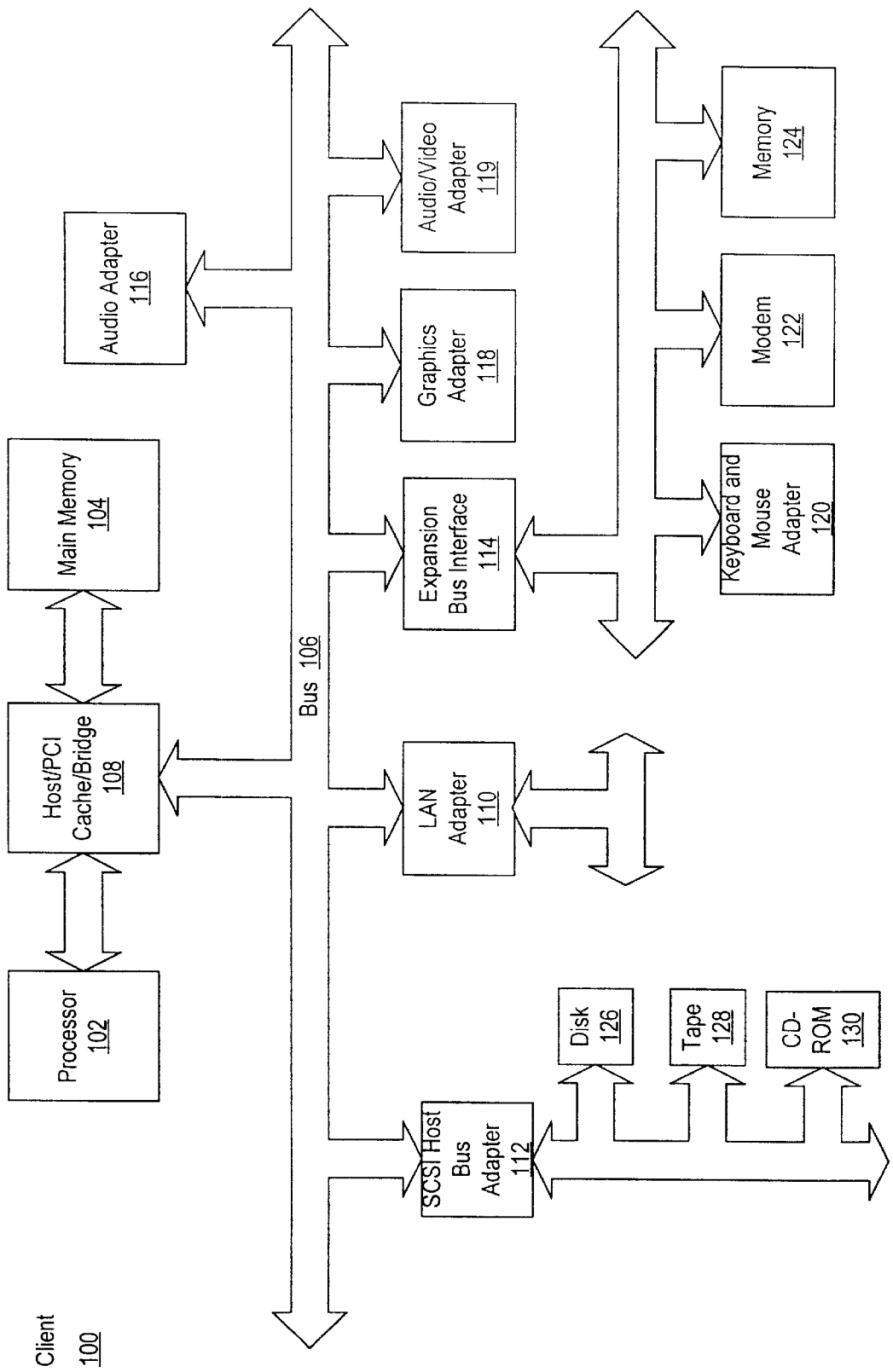

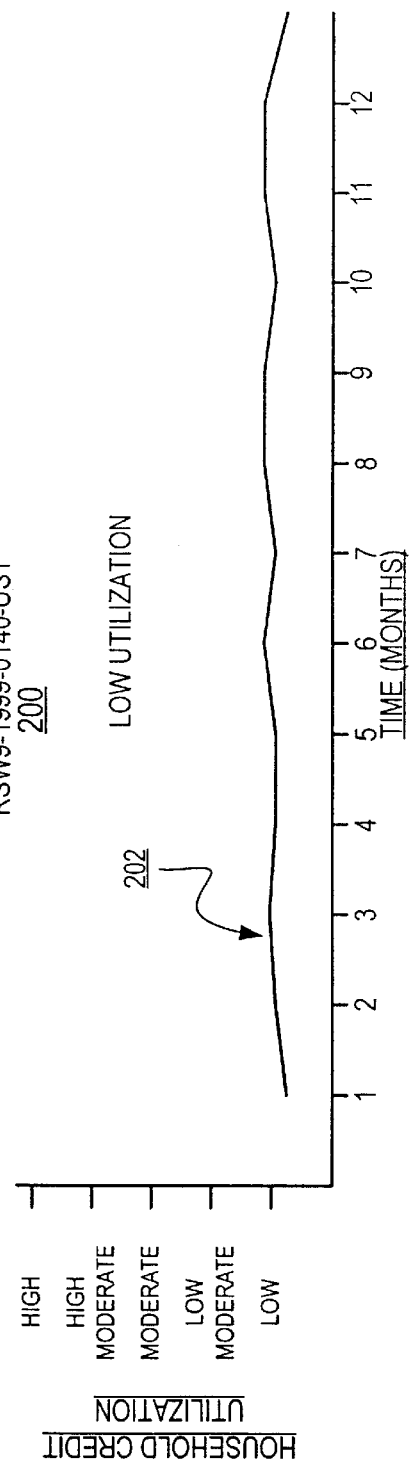
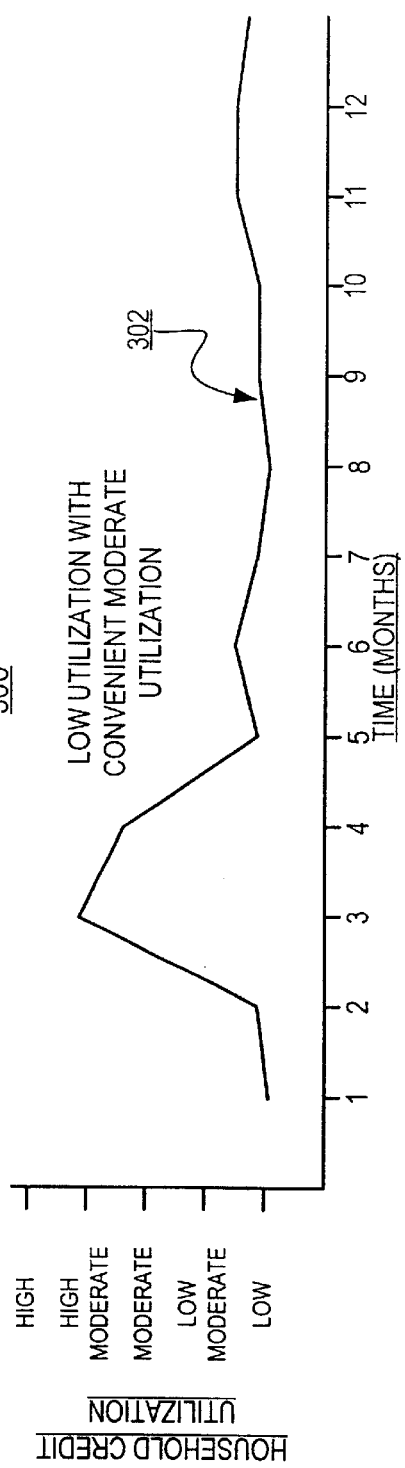

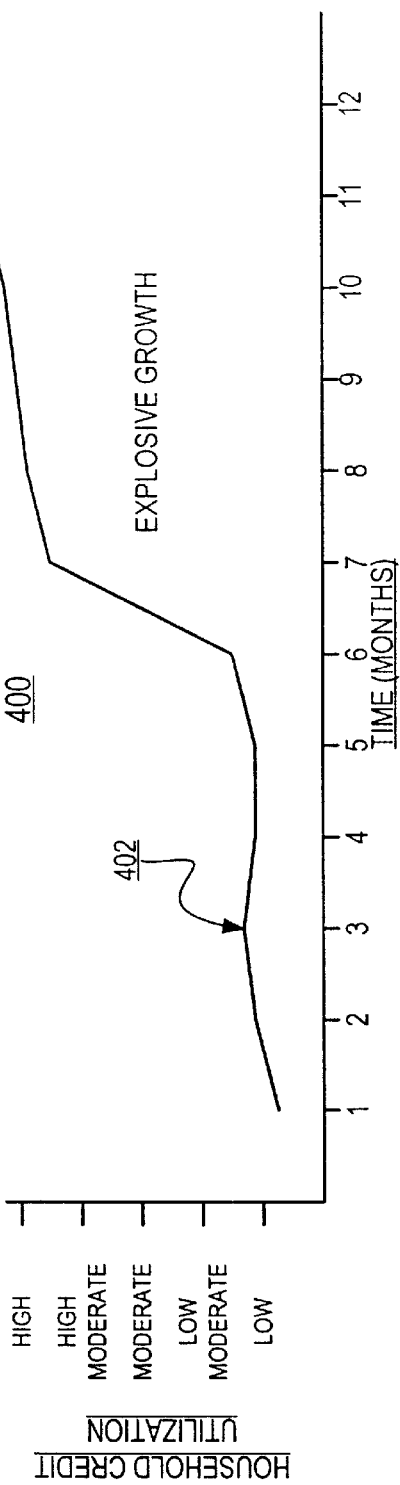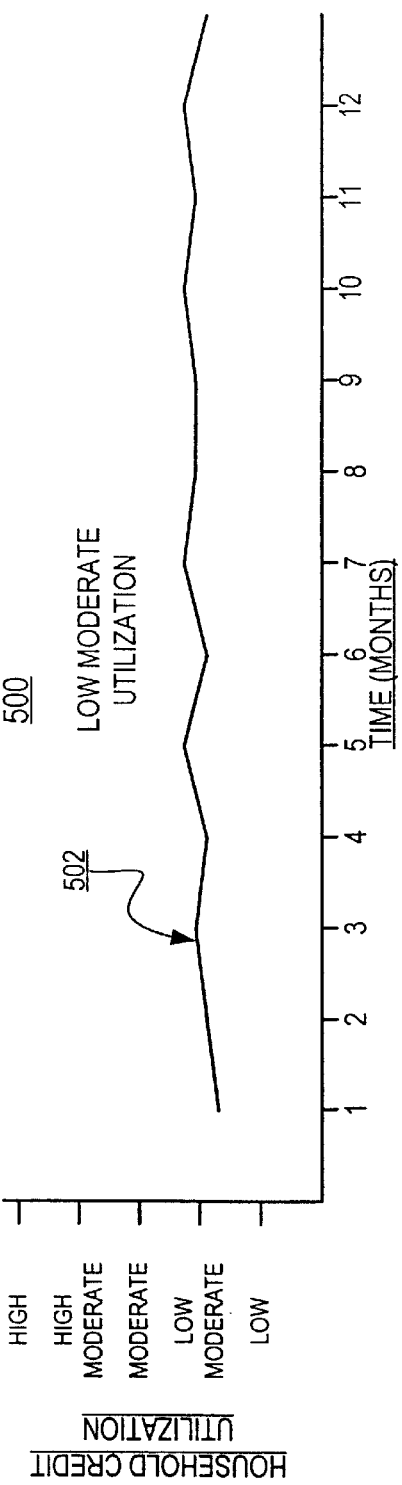

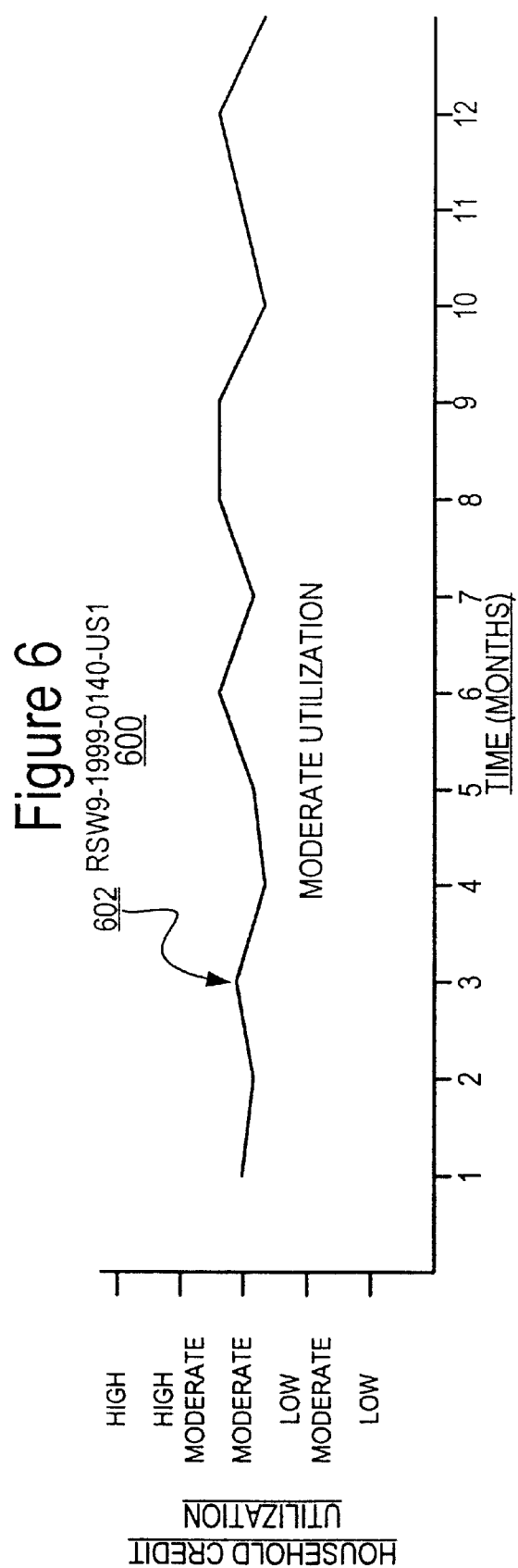

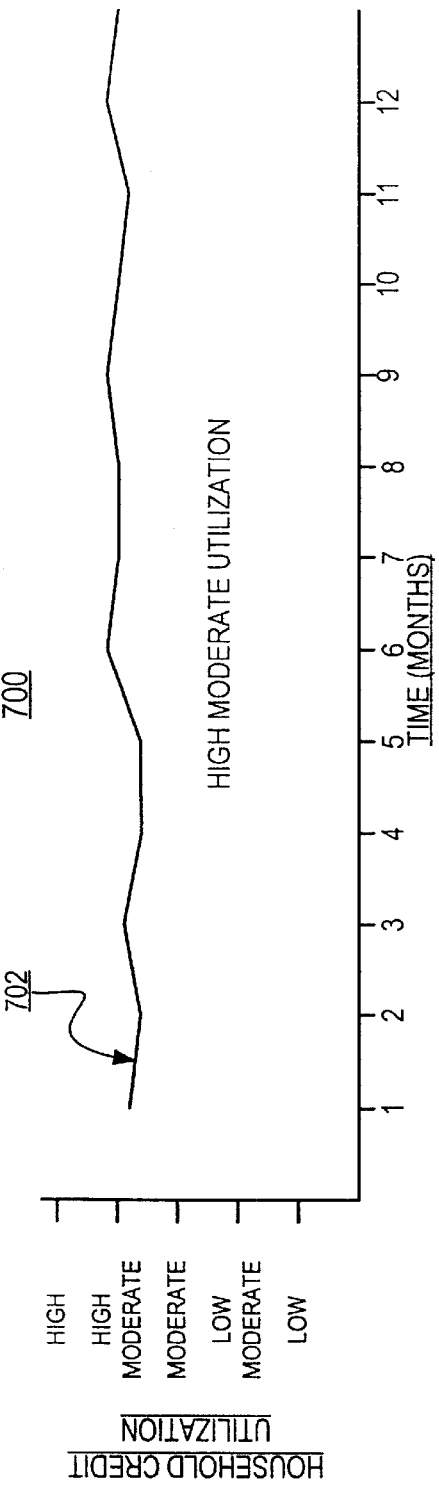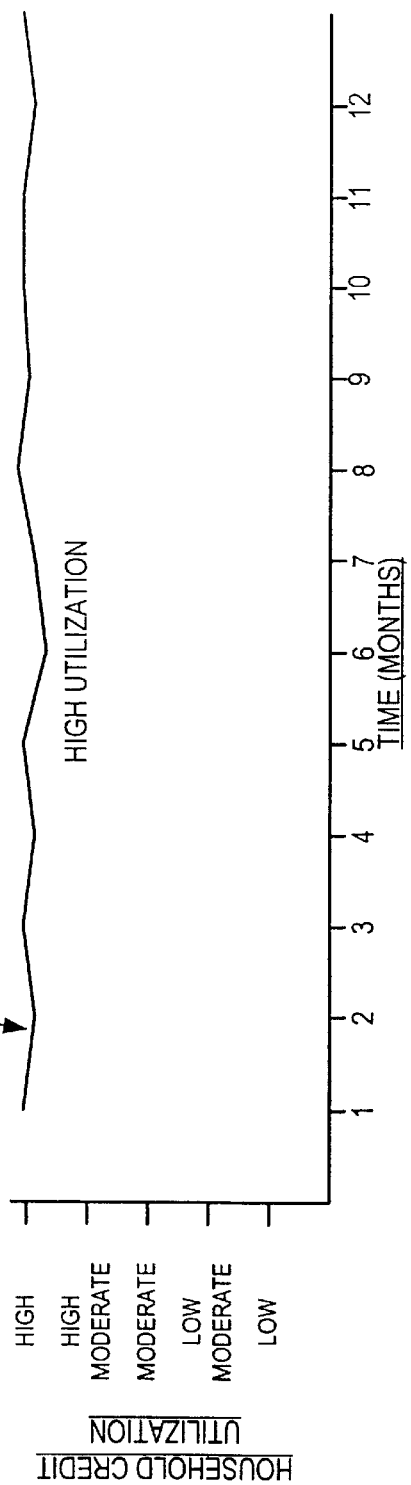

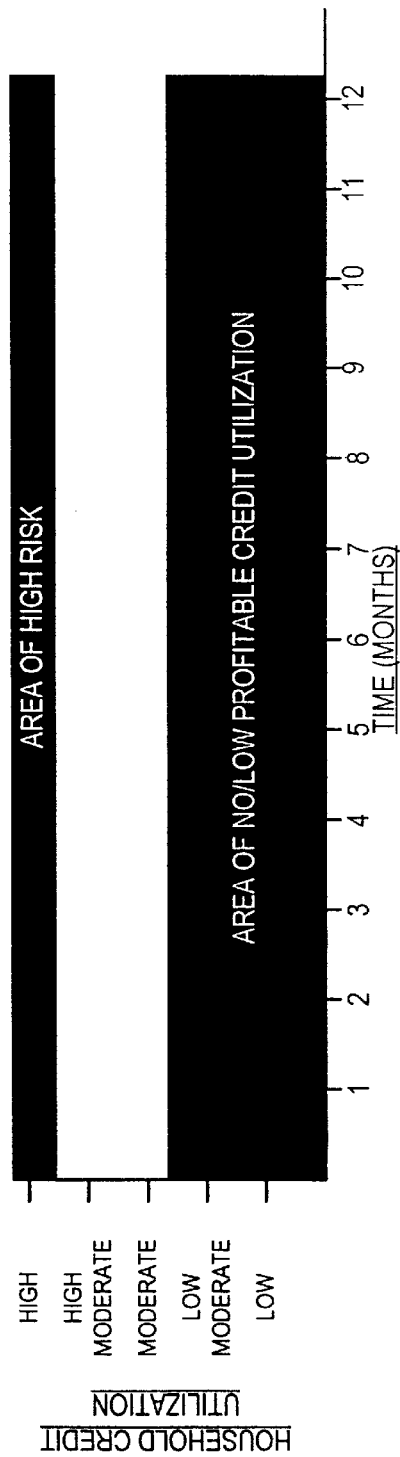
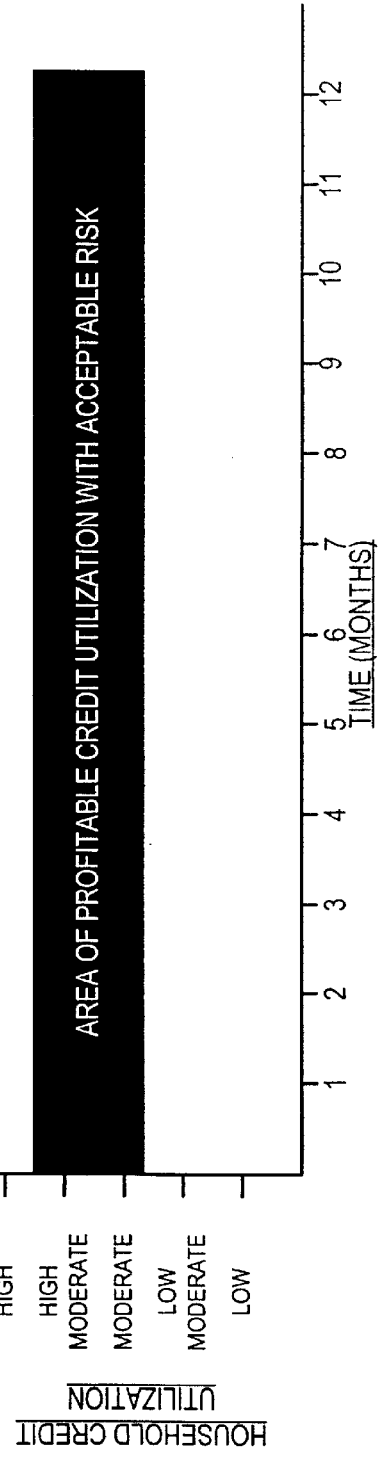

RSW9-1999-0140-US1

RSW9-1999-0140-US1
Household Time Series Segmentation Results
1100

RSW9-1999-0140-US1

Household Time Series Segmentation Results
1200

RSW9-1999-0140-US1

METHOD AND SYSTEM FOR IDENTIFYING CONSUMER CREDIT REVOLVERS WITH NEURAL NETWORK TIME SERIES SEGMENTATION

BACKGROUND OF THE INVENTION

1. Technical Field

The present invention is related to consumer credit. More particularly the present invention is a system, method and instruction for identifying which potential customers are credit revolvers for card issuers.

2. Description of Related Art

Strong competition in credit card industry has driven banks and credit card issuers to compete for a few profitable customers. Credit card issuers make their profit out of approximately 20% of total portfolio customers; most of them are revolvers. The major portion of profits for credit card issuers is from higher interest rates charged to credit revolvers. Credit revolvers or revolvers are customers who carry a balance on their credit card accounts from month to month. In general, revolvers are more profitable customers than those who do not carry a monthly balance on their credit card accounts.

Credit card utilization is the percentage of total available credit being utilized by a customer. Neither very high nor very low revolving utilization is considered to be good by credit card issuers. Revolvers with very high credit utilization are considered to be high-risk customers by most credit card issuers. Very high credit utilization may indicate that a customer is in the midst of financial difficulty. Very high credit utilization may put the credit card issuers at high risk for charge-off, or bankruptcy.

Another undesirable credit utilization pattern is an explosive growth pattern. Explosive credit utilization patterns may also lead to delinquency, charge-off, or bankruptcy because the pattern is indicative of a deleterious change in a customer's financial state. Therefore, credit card issuers must also avoid all potential customers, including revolvers, who demonstrate explosive credit utilization growth unless they have very good strategy to manage high risk customers.

Conversely, most customers with low or even zero utilization do not represent a credible risk to credit card issuers immediately, however, neither do these customers contribute to the credit card issuers' profits. Customers that maintain credit card accounts merely for the convenience of having instant credit available while shopping are known as convenient users. Normally these customers immediately pay their purchases off. Credit issuers must cover relatively high operation costs for administering customer accounts.

It would be advantageous to provide credit card issuers with the means to filter out unprofitable customers from targeting groups. It would further be advantageous to provide credit card issuers with the means to filter out high-risk customers. It would still further be advantageous to provide a system, method and instructions for objectively filtering out unprofitable customers while acquiring profitable customers.

SUMMARY OF THE INVENTION

The present invention relates to a method, system and instructions for generating a stable, time series segmentation credit utilization chart and identifying profitable revolvers from that chart. The process begins by acquiring customer time series credit files. The credit files are organized in a data mart environment that supports a query system. Time series utilization attributes are created first. Then a neural network time series segmentation algorithm is applied to the data. A resultant N×N dimension segments chart is generated for analyses. The chart may be further modified to more accurately depict profitable credit revolvers. Profitable credit revolvers are identified by having credit utilization patterns belonging to one or more of the segments in the N×N chart previously identified.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram illustrating a data processing system in which the present invention may be implemented;

FIG. 2 is a time series segment representing a low credit utilization pattern;

FIG. 3 is a time series segment representing a low credit utilization pattern with temporary higher utilization patterns indicating convenient utilization;

FIG. 4 is another time series segment, this segment represents a LOW credit utilization pattern with explosive growth;

FIG. 5 is a time series segment representing LOW MODERATE credit utilization pattern;

FIG. 6 is a time series segment representing MODERATE credit utilization pattern;

FIG. 7 is a time series segment representing HIGH MODERATE credit utilization pattern;

FIG. 8 is a time series segment representing HIGH credit utilization pattern;

FIGS. 9A and 9B are segments representing areas of interest in a credit utilization segment;

DETAILED DESCRIPTION OF THE PREFERRED EMBODIMENT

Figure 10:
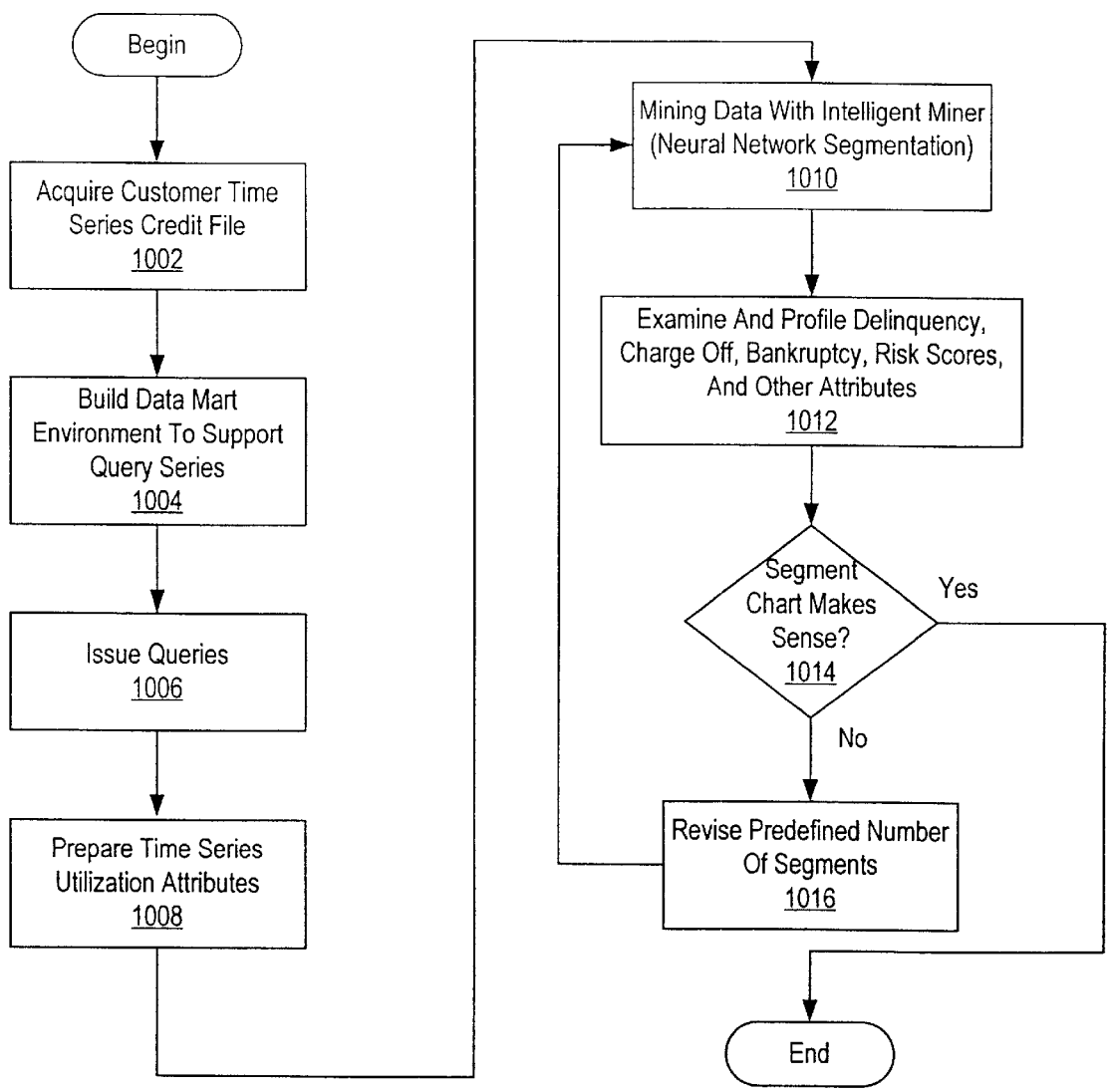
FIG. 10 is a flowchart depicting the process in accordance with a preferred embodiment of the present invention for generating a stable time series segmentation chart which can be used for accurately identifying profitable revolvers.

With reference now to the figures, FIG. 1 is a block diagram illustrating a data processing system in which the present invention may be implemented. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations support three or four PCI expansion slots or add-in connectors.

An operating system runs on processor 102 and is used to coordinate and provide control of various components within data processing system 100 in FIG. 1. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide nonvolatile memory for storing operating system files and/or user-generated data.

Neither the depicted example in FIG. 1 nor the above-described examples are meant to imply architectural limitations.

As mentioned above, credit card issuers make their profit out of about 20% of total portfolio customers, most of which are credit revolvers. Credit revolvers are profitable customers for credit issuers. However, even profitable customers represent a risk to credit issuers. Identifying potentially profitable customers without incurring undue risk is paramount to credit issuers. In accordance with a preferred embodiment of the present invention is a process for using time series segmentation to identify credit revolvers. By identifying "good" revolvers, a majority of others, such as transactors and high-risk customers, are felted out from customer targeting. The results can be used to identify customers who may charge on their credit card and carry a reasonable amount of balances as time goes on. This type of revolver is the most profitable customer for credit card issuers. The information can be used for new customer targeting and existing customer management. For customer acquisition, credit card issuers should target those revolvers with acceptable risk levels. For managing existing customers, the information can be used to guide customer retention programs. Limited budgets should be spent on those customers with profitable utilization levels and limited risk range, but with high likelihood to close their accounts. Because of competition, the highly profitable and low risk customers are the ones that every company would like to acquire and retain. These customers are generally the good revolvers.

A key advantage of the present process is that it can be used to identify good revolvers. By identifying medium to high volume revolvers, transactors (convenient users) and high risk (high and explosive growth utilization) customers can also be identified. By excluding transactors and high-risk customers from targeting pools of new customers, credit card issuers can avoid large amounts of operation costs and losses due to delinquency, charge-off and bankruptcy. Neural network segmentation with time series data can be performed with available credit bureau information.

In accordance with a preferred embodiment of the present invention, identifying good revolvers is accomplished by performing segmentation on customer time series utilization levels. One to two years of historical customer credit data is ideal, but twelve-months worth of data will suffice if either twenty-four months data is not available or storage and process spaces are limited. Customer time series credit files are used for an initial segmentation analysis based on a large group of customers. The larger the sampling number of customers, the lower the potential error rate. Additionally, the time series segmentation chart stabilizes when the initial segmentation analysis is based on a relatively large group of customers. Once initial segmentation is done, almost 90% of the work is complete. Customer types are then identifiable based on credit utilization patterns—these patterns are identified by neural network time series segmentation.

One of ordinary skill in the art would be familiar with neural network segmentation. Neural clustering methods are built on neural networks, typically using Kohonen feature maps, and can accept numeric input only. The distance measurement technique is based on Euclidian distance, and the resulted segments are arranged in a hierarchy where the most similar segments are placed close together.

A feature map neural network consists of two layers of processing units, an input layer fully connected to a competing output layer. There is no hidden layer. When an input pattern is presented to the feature map, the units in the output layer compete with each other for the right to be declared as the winner. The winning output unit is typically the unit whose incoming connection weights are the closest to the input pattern in terms of Euclidean distance. The winner's connection weights are adjusted. The connection weights are moved in the direction of the input pattern by a factor determined by a learning rate parameter. The Kohonen feature map creates a topological mapping by adjusting not only the winner's weights, but also adjusting the weight of the adjacent output units in close proximity to or in the neighborhood of the winner. Starting from randomized weight values, the output units slowly align themselves such that when input is presented, a neighborhood of units responds to the input pattern. As training progresses, the size of the neighborhood radiating out from the winning unit decreases. Initially, large numbers of output units will be updated, and later on smaller and smaller numbers are updated until the end of training, at which time only the winning unit is adjusted. The learning rate decreases as training progresses and learning rate decays with the distance from the winning output unit.

The present process can be described in two steps. The first step is to perform segmentation analysis based on time series utilization levels. Based on utilization patterns identified by neural network time series segmentation, consumers in different segments will show different types of utilization patterns.

The ideal group will be those customers with stable, low risk, medium to high utilization levels. Those consumers with very high and explosive growth patterns indicate high risk. Thus, those customers are identified as less than ideal customers for banks and credit card companies to target unless credit issuers have good strategy to manage those high risk customers. Credit issuers should also avoid those customers with very low or even zero utilization levels because they lead to financial losses.

Once segments are determined, customer profiles should be analyzed and examined for each segment. This is the second and last step. In general, some revision may be necessary. Modeler and business analysts may have to work together to determine what is the optimal number of segments. The number is determined in a way so that important patterns can be distinguished between the individual segments in the chart. Some segments may have to be combined together to make sure there are clear actions that credit issuers can take to increase their profits or reduce costs. At the end, a final N×N dimension segmentation chart or matrix of household credit utilization segments is produced.

A credit manager can then easily distinguish credit utilization patterns. More importantly, time series segments are defined within the chart such that important household credit utilization patterns can be delineated in time series seg- ments. In so doing customers having either desirable or undesirable credit utilization patterns can be identified within the chart.

FIGS. 2–9 are time series segments representing a variety of household credit utilization patterns. Each credit utilization curve in the time series segments depicts household credit utilization plotted against time. Alternatively, household credit utilization could be represented as a series of discreet points in time to represent any of the patterns described below.

FIG. 2 is a time series segment representing a low credit utilization pattern. With respect to segment 200, note that curve 202 fluctuates proximate to the LOW utilization level throughout time. Generally a household having low or no credit utilization does not generate enough revenue to cover operating expenses needed to support a customer's credit account.

FIG. 3 is a time series segment representing a low credit utilization pattern with occasional higher utilization patterns. In segment 300, curve 302 represents household credit utilization plotted against time, similar to that illustrated in FIG. 2. Note that curve 302 fluctuates proximate to the low utilization level except for month 2–5 where the household credit pattern has increased from LOW to MODERATE and HIGH MODERATE levels of credit usage. While it is clear that the credit utilization pattern depicted by curve 302 is somewhat more profitable than curve 202 shown in FIG. 2, the household credit utilization pattern shown is FIG. 3 may not be very profitable.

FIG. 4 is another time series segment which represents an explosive growth pattern. In segment 400, curve 402 initially represents LOW household credit utilization but rapidly increases to HIGH MODERATE or HIGH credit utilization in the sixth month. The level of credit utilization continues at that level throughout the remainder of the time series segment. Generally, an explosive growth credit utilization pattern is indicative of a customer who has unexpectedly needed to rely on credit due to a financial setback. While these customers may appear to generate interest income, they have a much higher risk for delinquency, charge-off, or bankruptcy. Thus, customers with an explosive growth credit utilization pattern, in general, are high-risk customers and should be avoided, unless a good strategy has been designed to manage those high risk customers.

FIG. 5 is a time series segment representing a LOW MODERATE pattern of credit utilization. With respect to segment 500, curve 502 represents a customer having stable, LOW MODERATE household credit utilization. While households or customers identified as having LOW MODERATE credit utilization patterns are somewhat more profitable that those with LOW credit utilization patterns, LOW MODERATE credit utilization patterns may still be unprofitable customers, whether they should not be sought depends on credit issuer's objective.

FIG. 6 is a time series segment representing a MODERATE credit utilization pattern. Segment 600 is identical to segment 500 depicted in FIG. 5 in all aspects except utilization level. With respect to segment 600, curve 602 represents a customer having stable, MODERATE household credit utilization, which is quantifiably higher than LOW MODERATE credit utilization. Customers having stable, MODERATE credit utilization patterns are both profitable and low risk for credit issuers. Customers with stable, MODERATE credit utilization patterns are therefore identified as good revolvers, because they maintain a reasonable balance on their credit card accounts without over-utilizing their credit. Not over-utilizing credit is an important attribute to the credit card issuers because good revolvers represent a low risk for delinquency, charge-off, or bankruptcy. Good revolvers are highly sought after by credit card issuers because of their potential for profitability with acceptable risk.

FIG. 7 is a time series segment representing HIGH MODERATE credit utilization pattern. Curve 702 in segment 700 is identical to segment 600 depicted in FIG. 6 in all aspects except utilization level. Curve 702 indicates that this customer has a stable, HIGH MODERATE credit utilization pattern. Customers having stable, HIGH MODERATE credit utilization patterns are both profitable and of reasonable risk to credit issuers, similar to customers having a MODERATE credit utilization pattern. These customers are also good revolvers but are referred to as serious revolvers because they have a more serious pattern of revolving credit and are also highly sought after by credit card issuers because of their potential for profitability.

FIG. 8 is a time series segment representing a HIGH credit utilization pattern. Segment 800 is identical to segment 700 depicted in FIG. 7 in all aspects except utilization level. Curve 802 in segment 800 indicates HIGH customer credit utilization. Customers having a HIGH credit utilization pattern are very profitable to a credit issuer in terms of intent and income. However, assuming that the customer's available credit has been properly adjusted for the customer's financial situation, sustained HIGH credit utilization is indicative of a customer spending beyond their means or other financial difficulty. These customers put the credit issuer at much higher risk for losses due to charge-off or bankruptcy than customers with either HIGH MODERATE or MODERATE credit utilization patterns. These customers should be reviewed frequently and managed carefully.

FIGS. 9A and 9B are time series segments representing areas of interest in a credit utilization segment. Each segment pattern in an N×N dimension segmentation chart is analyzed for profitability and risk indicators. High-risk areas and low profit areas in the N×N dimension chart are identified. Identifying good credit revolvers is therefore simplified by identifying customer credit utilization patterns that do not extend into high-risk areas and low profit areas of a segment. FIG. 9A shows high-risk and low profit areas in shading. Any segment with a credit utilization pattern which protrudes into either of those areas represents a customer that may not be an ideal customer on either profitability or risk factors. Conversely, FIG. 9B shows the acceptable risk and high profit area of a segment by shading. A segment within the time series segmentation chart with a credit utilization pattern within this area represents a customer that should be targeted or retained.

In accordance with a preferred embodiment of the present invention, customers are objectively classified by credit utilization based on a comparison with identified customer credit utilization patterns. These patterns are output by the neural network time series segmentation process into an N×N dimension segmentation chart. A customer credit utilization pattern is then compared to each of the N×N identified patterns. The customer credit utilization pattern is classified as one of these, which indicates whether the customer is a good credit revolver.

FIG. 10 is a flowchart depicting the process in accordance with a preferred embodiment of the present invention for generating a stable time series segmentation chart which can be used for accurately identifying profitable revolvers. Therefore, in accordance with a preferred embodiment of the present invention, prior to identifying good credit revolvers, a time series segmentation chart must be created from a sufficiently high number of households such that the training process is substantially completed. The process begins by acquiring customer time series credit files from a credit bureau or the like (step 1002).

Again, in order to stabilize the time series segmentations in the chart, a relatively large number of household time series credit histories must be entered. In application of the present method, 1.1 million household histories were entered into the process for approximately 2.2 million customers. The results derived from this quantity of entries indicate that chart stability could be realized by inputting a smaller quantity of customer credit files. Customer time series credit files represent twelve to eighteen months of raw customer credit information or files.

Returning to step 1002, once the customers' time series credit files have been acquired, a data mart environment is built to support a query system (step 1004). A data mart is a type of data warehouse designed primarily to address a specific function or department's needs, as opposed to a data warehouse which is traditionally meant to address the needs of the organization from an enterprise perspective. In a preferred embodiment of the present invention, the data mart supports SQL (Structured Query Language). The SQL queries are then issued (step 1006).

Once the household credit data has been extracted, the neural network segmentation process described above (step 1010) is then applied to time series utilization attributes (step 1008). Results of the segmentation process are examined and profiled for delinquency, charge off, bankruptcy, risk scores, and other attributes (step 1012). Next, a determination is made as to whether the N×N dimension time series segmentation chart makes sense in terms of business objectives, i.e., identifying good credit revolvers (step 1014). If the time series segmentation chart separates customers into relative homogenous groups, the process ends. If, on the other hand, the chart does not separate revolvers from no revolvers, or does not group revolvers together, the number of segments must be revised (step 1016) and the process returns to step 1010 where the data in the data mart is once again subjected to the neural network segmentation process. The process continues until the determination at step 1014 indicates that the N×N dimension time series segmentation chart accurately separates customers into homogenous groups in terms of credit identification patterns.

Figure 11:
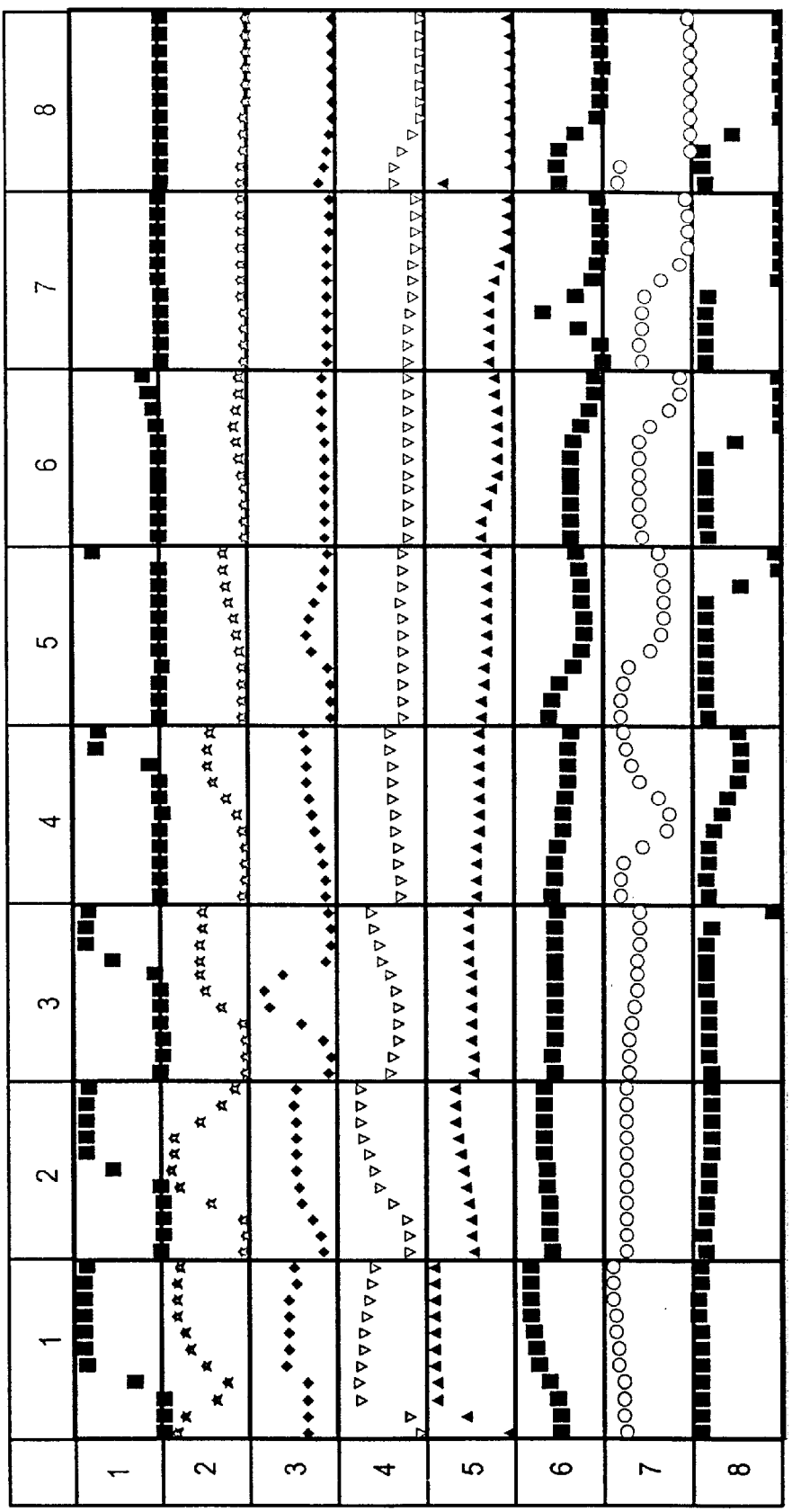
FIG. 11 is a time series segmentation chart depicting household credit utilization pattern.

FIG. 11 is a time series segmentation chart depicting segmentation results from the neural network time series utilization segmentation process described above in accordance with a preferred embodiment of the present invention. Referring to chart 1100, an 8×8-time series segmentation chart is depicted, but a chart of any size could be accommodated by the process. It is important to remember that the chart is merely a tool to aid the credit manager so the total number of segments should be held to a minimum. From chart 1100 various credit utilization patterns are easily identifiable, for instance segments (7,1), (8,1), (7,2), (8,2), (7,3), (8,3), (7,4), (8,4) and (8,5) represent unprofitable credit utilization patterns. At the opposite end of chart 1100, segment (1,8) represents an extremely profitable but high-risk credit utilization pattern. Segments (1,1), (2,1), (3,1), (4,1), and (5,1), on the other hand, represent credit utilization patterns with explosive growth. Finally, segments (5,7), (6,7), (7,7), (7,8), (8,5), (8,6), (8,7) and (8,8) represent credit utilization patterns with significant deceleration. From chart 1100 it is merely a matter of identifying credit revolver segments.

Figure 12:
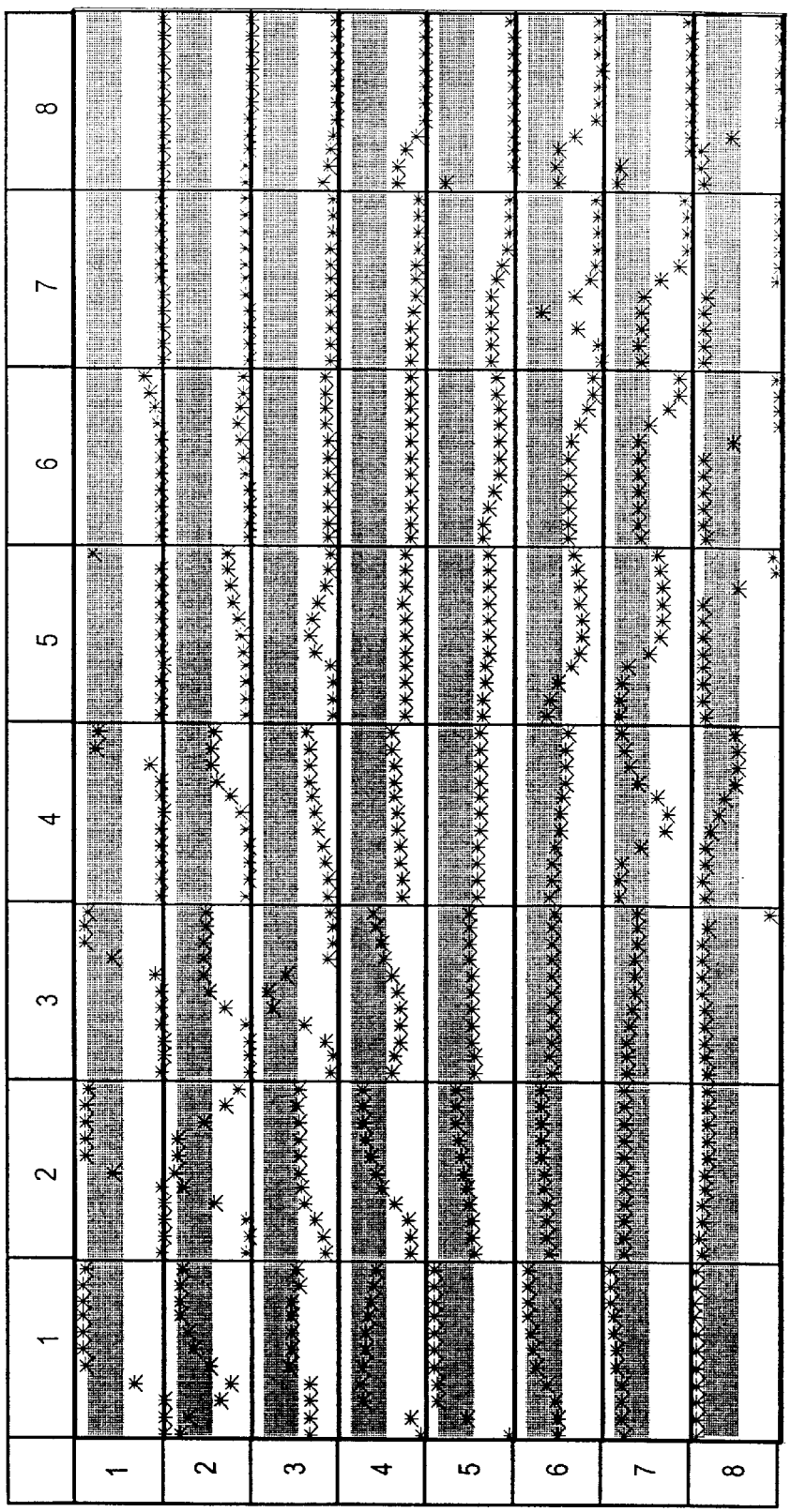
FIG. 12 is the time series segmentation chart depicted in FIG. 11, wherein the segmentation areas indicating acceptable risk and high profit are shaded.

FIG. 12 is a time series segmentation chart 1100 depicted in FIG. 11, wherein segment areas indicating low risk and high profit have been shaded. Segments in chart 1200 are shaded, highlighting areas of high profit and low risk similar to chart 950 in FIG. 9B. In chart 1200, credit revolvers are easily identified by finding chart segments in which the credit utilization patterns do not extend beyond the shaded area. Segments (2,6), (3,6), (2,7) and (3,7) are readily identified as very profitable credit revolvers. With closer scrutiny, segment (4,8) also qualifies as profitable revolvers while segment (2,8) narrowly misses the criteria. Segments (2,5), (3,4), (3,5), (4,4), (4,5), and (4,6) are also profitable revolvers in which groups of customers should be targeted depends on the credit issuer's objectives.

Figure 13:
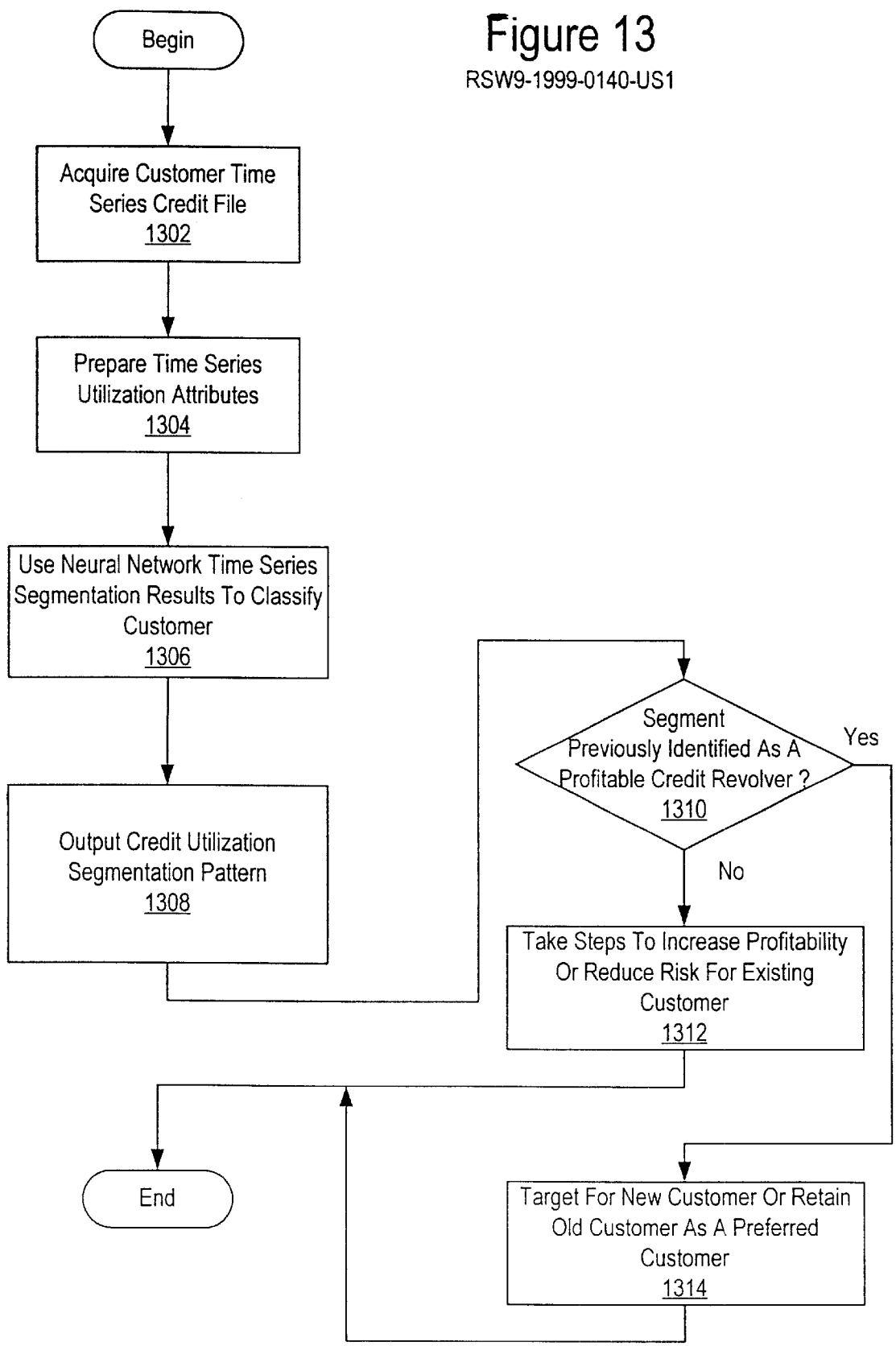
FIG. 13 is a flowchart depicting process for accurately identifying profitable revolvers in accordance with a preferred embodiment of the present invention.

FIG. 13 is a flowchart depicting a process for accurately identifying profitable revolvers in accordance with a preferred embodiment of the present invention. Once a stable and accurate N×N dimension time series segmentation chart has been generated by the process described by the flowchart in FIG. 10, credit utilization patterns of individual customers and households may be examined for good revolver credit utilization patterns. The process is similar to that described above, but is somewhat abbreviated. Initially, a customer's time series credit file is obtained from a credit bureau or the like (step 1302). The identical time series utilization attributes used for producing the N×N time series segmentation chart are used to process the customer's credit file (step 1304). The neural network time series segmentation model is applied to the customer's credit history (step 1306) and a credit utilization segmentation pattern is classified as one of the segments in the N×N dimension time series segmentation chart (step 1306). Next, a determination is made as to whether that segment has been previously identified as a good credit revolver (step 1310). If it is determined that the credit utilization pattern indicates that the customer is not a good credit revolver, the customer may not be targeted and limited efforts should be spent on targeting the existing customer (step 1312). Similarly, the credit issuer can also take steps to reduce its exposure to high-risk customers by reducing the customer's credit limit. If in step 1310 above, it is determined that the credit utilization pattern indicates that the customer is a profitable credit revolver, a prospect customer should be targeted or a good strategy should be used to retain an existing customer, to avoid attrition (step 1314). The process then ends.

Empirical results have shown that this process is very efficient for identifying those customers who are profitable revolvers with an acceptable risk level. The major advantage is that time series segmentation provides important information about consumers' dynamic changes in financial status.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A data processing system implemented method for identifying a profitable credit revolver:

receiving credit history data for a creditor;

processing the credit history data using neural network time series segmentation;

receiving a time series credit utilization pattern for the creditor, wherein the time series credit utilization pattern is representative of the credit history for the creditor; and comparing the time series credit utilization pattern for the creditor to a plurality of time series credit utilization patterns.

2. The method recited in claim 1, further comprising generating a time series segmentation chart using neural network time series segmentation.

3. The method recited in claim 2, wherein the chart is an N×N dimension chart having an N×N number of time series segments.

4. The method recited in claim 1, wherein processing the credit history data using neural network time series segmentation further comprises profiling the N×N number of time series segments for one of delinquency, charge off, bankruptcy and risk scores.

5. The method recited in claim 1, wherein comparing the time series credit utilization pattern for the creditor to a plurality of time series credit utilization patterns further comprises:

comparing the time series credit utilization pattern for the creditor to a time series credit utilization pattern representative of low profit credit utilization;

comparing the time series credit utilization pattern for the creditor to a time series credit utilization pattern representative of profitable credit revolver having a profitable credit utilization; and classify the creditor as a profitable credit revolver based on the comparisons.

6. A data processing system implemented method for identifying a profitable credit revolver:

receiving credit history data for a plurality of creditors;

processing the plurality credit history data using neural network time series segmentation;

generating a time series segmentation chart; and identifying at least one segment in the chart that is representative of a credit utilization pattern for a profitable credit revolver.

7. The method recited in claim 6, wherein the time series chart is an N×N dimension chart having an N×N number of time series segments.

8. The method recited in claim 7, wherein identifying at least one segment in the chart that is representative of a credit utilization pattern for a profitable credit revolver further comprises profiling the N×N number of time series segments for one of delinquency, charge off, bankruptcy and risk scores.

9. The method recited in claim 8, prior to identifying at least one segment in the chart that is representative of a credit utilization pattern for a profitable credit revolver the method further comprises:

determining if at least one segment in the chart is representative of a credit utilization pattern for a profitable credit revolver;

revising the total number of segments in the time series chart based on at least one segment in the chart not being representative of a credit utilization pattern for a profitable credit revolver;

reprocessing the plurality credit history data using neural network time series segmentation; and regenerating an altered time series segmentation chart, wherein the altered time series segmentation chart contains a different total number of segments that the time series chart.

10. A data processing system for identifying a profitable credit revolver:

receiving means for receiving credit history data for a creditor;

processing means for processing the credit history data using neural network time series segmentation;

receiving means for receiving a time series credit utilization pattern for the creditor, wherein the time series credit utilization pattern is representative of the credit history for the creditor; and comparing means for comparing the time series credit utilization pattern for the creditor to a plurality of time series credit utilization patterns.

11. The system recited in claim 9, further comprising means for generating a time series segmentation chart using neural network time series segmentation.

12. The system recited in claim 11, wherein the chart is an N×N dimension chart having an N×N number of time series segments.

13. The system recited in claim 9, wherein the processing means for processing the credit history data using neural network time series segmentation further comprises a profiling means for profiling the N×N number of time series segments for one of delinquency, charge off, bankruptcy and risk scores.

14. The system recited in claim 9, wherein the comparing means for comparing the time series credit utilization pattern for the creditor to a plurality of time series credit utilization patterns further comprises:

comparing means for comparing the time series credit utilization pattern for the creditor to a time series credit utilization pattern representative of low profit credit utilization;

comparing means for comparing the time series credit utilization pattern for the creditor to a time series credit utilization pattern representative of profitable credit revolver having a profitable credit utilization; and classify means for classify the creditor as a profitable credit revolver based on the comparisons.

15. A data processing system for identifying a profitable credit revolver:

receiving means for receiving credit history data for a plurality of creditors;

processing means for processing the plurality credit history data using neural network time series segmentation;

generating means for generating a time series segmentation chart; and identifying means for identifying at least one segment in the chart that is representative of a credit utilization pattern for a profitable credit revolver.

16. The system recited in claim 15, wherein the time series chart is an N×N dimension chart having an N×N number of time series segments.

17. The system recited in claim 16, wherein the identifying means for identifying at least one segment in the chart that is representative of a credit utilization pattern for a profitable credit revolver further comprises profiling means for profiling the N×N number of time series segments for one of delinquency, charge off, bankruptcy and risk scores.

18. The system recited in claim 17, further comprises:

determining means for determining if at least one segment in the chart is representative of a credit utilization pattern for a profitable credit revolver;

revising means for revising the total number of segments in the time series chart based on at least one segment in the chart not being representative of a credit utilization pattern for a profitable credit revolver;

reprocessing means for reprocessing the plurality credit history data using neural network time series segmentation; and regenerating means for regenerating an altered time series segmentation chart, wherein the altered time series segmentation chart contains a different total number of segments that the time series chart.

19. A computer program product for implementing a method for identifying a profitable credit revolver:

receiving instructions for receiving credit history data for a creditor;

processing instructions for processing the credit history data using neural network time series segmentation;

receiving instructions for receiving a time series credit utilization pattern for the creditor, wherein the time series credit utilization pattern is representative of the credit history for the creditor; and comparing instructions for comparing the time series credit utilization pattern for the creditor to a plurality of time series credit utilization patterns.

20. The computer program product recited in claim 19, further comprising generating instructions for generating a time series segmentation chart using neural network time series segmentation.

21. The computer program product recited in claim 20, wherein the chart is an N×N dimension chart having an N×N number of time series segments.

22. The computer program product recited in claim 19, wherein the processing instructions for processing the credit history data using neural network time series segmentation further comprises profiling instructions for profiling the N×N number of time series segments for one of delinquency, charge off, bankruptcy and risk scores.

23. The computer program product recited in claim 19, wherein the comparing instructions for comparing the time series credit utilization pattern for the creditor to a plurality of time series credit utilization patterns further comprises:

comparing instructions for comparing the time series credit utilization pattern for the creditor to a time series credit utilization pattern representative of low profit credit utilization;

comparing instructions for comparing the time series credit utilization pattern for the creditor to a time series credit utilization pattern representative of profitable credit revolver having a profitable credit utilization; and classify instructions for classify the creditor as a profitable credit revolver based on the comparisons.

24. A computer program product for implementing a method for identifying a profitable credit revolver:

receiving instructions for receiving credit history data for a plurality of creditors;

processing instructions for processing the plurality credit history data using neural network time series segmentation;

generating instructions for generating a time series segmentation chart; and identifying instructions for identifying at least one segment in the chart that is representative of a credit utilization pattern for a profitable credit revolver.

25. The computer program product recited in claim 24, wherein the time series chart is an N×N dimension chart having an N×N number of time series segments.

26. The computer program product recited in claim 25, wherein the identifying instructions for identifying at least one segment in the chart that is representative of a credit utilization pattern for a profitable credit revolver further comprises profiling the N×N number of time series segments for one of delinquency, charge off, bankruptcy and risk scores.

27. The computer program product recited in claim 26, further comprises:

determining means for determining if at least one segment in the chart is representative of a credit utilization pattern for a profitable credit revolver;

revising means for revising the total number of segments in the time series chart based on at least one segment in the chart not being representative of a credit utilization pattern for a profitable credit revolver;

reprocessing means for reprocessing the plurality credit history data using neural network time series segmentation; and regenerating means for regenerating an altered time series segmentation chart, wherein the altered time series segmentation chart contains a different total number of segments that the time series chart.

* * * * *